United States Patent
Davidson

(10) Patent No.: US 7,856,726 B2
(45) Date of Patent: Dec. 28, 2010

(54) ROTARY ENCODER AND ROTOR MACHINE

(75) Inventor: Hartmut Davidson, Nittendorf (DE)

(73) Assignee: Krones AG, Neutraubling (DE)

( * ) Notice: Subject to any disclaimer, the term of this patent is extended or adjusted under 35 U.S.C. 154(b) by 121 days.

(21) Appl. No.: 11/578,022

(22) PCT Filed: Nov. 16, 2005

(86) PCT No.: PCT/EP2005/012273

§ 371 (c)(1), (2), (4) Date: Jan. 4, 2007

(87) PCT Pub. No.: WO2006/053729

PCT Pub. Date: May 26, 2006

(65) Prior Publication Data

US 2008/0047151 A1   Feb. 28, 2008

(30) Foreign Application Priority Data

Nov. 18, 2004   (DE) .................. 10 2004 055 745

(51) Int. Cl.
*G01B 7/30* (2006.01)
*G01D 5/244* (2006.01)

(52) U.S. Cl. .................. 33/1 PT; 33/1 N; 33/706; 702/163

(58) Field of Classification Search .................. 33/1 PT, 33/1 N, 706, 707, 534; 702/151, 154, 163
See application file for complete search history.

(56) References Cited

U.S. PATENT DOCUMENTS

| 4,680,466 | A | * | 7/1987 | Kuwahara et al. ...... 250/231.14 |
| 4,716,943 | A | | 1/1988 | Yoshida et al. |
| 5,006,703 | A | * | 4/1991 | Shikunami et al. ..... 250/231.13 |
| 5,019,776 | A | * | 5/1991 | Kawamata et al. ..... 324/207.12 |
| 5,216,626 | A | * | 6/1993 | Kranitzky .................. 702/151 |
| 5,336,884 | A | * | 8/1994 | Khoshnevisan et al. 250/231.18 |
| 5,478,422 | A | * | 12/1995 | Bright et al. ................. 156/64 |
| 5,602,388 | A | * | 2/1997 | Maenza ................. 250/231.13 |
| 6,320,185 | B1 | * | 11/2001 | Matsuo .................. 250/231.13 |
| 6,334,248 | B1 | * | 1/2002 | Gallagher .................... 29/846 |
| 6,488,794 | B1 | * | 12/2002 | Bright et al. ................. 156/86 |
| 6,564,168 | B1 | * | 5/2003 | Hasser ...................... 702/163 |
| 6,752,189 | B2 | * | 6/2004 | Oldenburg et al. .......... 156/362 |

FOREIGN PATENT DOCUMENTS

| CH | 397261 A1 | 8/1965 |
| DE | 41 23 781 A1 | 1/1993 |
| DE | 694 11 178 | 10/1998 |
| EP | 0 660 263 A1 | 6/1995 |
| WO | WO-00/36377 A1 | 6/2000 |

* cited by examiner

Primary Examiner—Amy Cohen Johnson
(74) Attorney, Agent, or Firm—Marshall, Gerstein & Borun LLP

(57) ABSTRACT

A rotary encoder for a rotor machine with at least one track with a pulse series for the generation of signal pulses, where a selectable reduction of the signal pulses is possible for the output, and can include a rotor machine with a machine partition and a rotary encoder above. There is also a method by which, using a rotary encoder for a rotor machine, a reduction of the signal pulses to be output is selected, as well as to a method by which the signals of a rotary encoder of a rotor machine are output in accordance with a selected reduction.

15 Claims, 2 Drawing Sheets

ROTARY ENCODER AND ROTOR MACHINE

CROSS-REFERENCE TO RELATED APPLICATION

This is the U.S. national stage under 35 U.S.C. §371, of international application no. PCT/EP2005/012273, having an international filing date of Nov. 16, 2005, and claims priority to German application no. 10 2004 055 745.4 filed on Nov. 18, 2004.

FIELD OF THE DISCLOSURE

The disclosure relates to a rotary encoder having at least one track with a pulse series for the generation of signal pulses, a rotor machine with a rotary encoder, and to two methods for the rotary encoder.

BACKGROUND OF THE DISCLOSURE

In rotor machines, such as, for example, labeling, expansion blowing, inspection and closing machines for containers, such as bottles, cans, beakers or similar items; during the filling of such containers; in cleaning machines, for example rinsing machines, for such containers and similar items, the position of a rotor has to be determined with high precision.

Such rotor machines as a rule present a multitude of similar devices that are arranged in a certain angular distribution over the circumference of the rotor.

Thus, a labeling machine can have, for example, up to 60 or 70 rotating plates or more, by means of which containers to be labeled can be positioned to allow the correct positioning of the labels on the containers.

In the case of filling machines, it is possible to distribute a similar number of filling valves over the circumference of the rotor.

The angular distance between two such identical installations is called the machine partition.

To be able to achieve, during the treatment of the objects with the rotor machine, as precise as possible a control, it is necessary to know the position of the rotor with respect to the machine partition. This means that, in the case of a machine with a machine partition of, for example, 10°, this angular range has to be known precisely with a resolution of $\frac{1}{500}°$.

Depending on the requirements, smaller or higher resolutions can also be possible.

From the applicable state of the art, it is known, for example, from DE 694 11 178 T2, to provide a sensor-toothed wheel on one of the driving wheels of the shaft of the rotor, which wheel is connected to the rotary encoder.

It is known from practice here to adjust the sensor-toothed wheel and the driving toothed wheel in such a manner that the rotation of the rotor by one machine partition corresponds to turning rotary encoder by one rotation. Thus, if a rotor with a machine partition of 10° is rotated by 10°, then the sensor-toothed wheel has turned once by 360°. The rotary encoder can generate signals that reflect its position in the case of a full rotation at a desired resolution.

The drawback here is that a special sensor-toothed wheel must be constructed for each machine partition, so that the rotation of the rotor by one machine partition corresponds to a full rotation of the sensor-toothed wheel.

SUMMARY OF THE DISCLOSURE

The problem of the present disclosure, therefore, is to produce a rotary encoder and a rotor machine that make it possible to construct in as simple a manner as possible machines with different machine partitions.

This problem is solved by a rotary encoder, a rotor machine, as well as the two methods as disclosed herein.

With the rotary encoder, it is possible to apply a selectable reduction to the generated signal pulses. This means that, for example, instead of ten generated signal pulses, only one signal pulse is output. This would correspond to a 10:1 reduction.

By means of such a rotary encoder, it is possible to obtain the desired information concerning the position of the rotor in the case of direct coupling of the rotary encoder to a shaft of the rotor. As a result, the appropriate reduction corresponding to the machine partition is chosen. Such a rotary encoder can thus be used for different machines with different machine partitions.

Furthermore, no mechanical gear system is required, or only a certain gear system that can be used for different machine partitions.

For example, if the rotary encoder presents a track with a pulse series of 1 million pulses, then 1 million signal pulses are generated for one rotation. In the case of a machine partition of 3.6° (meaning that 100 identical components are provided), a 10,000:1 reduction makes it possible to produce one signal pulse for each turn by one machine partition.

Using correspondingly smaller reductions, signal pulses can be generated which resolve the position within one machine partition.

For example, if in the above example a reduction of 2:1 is chosen, then the signal output corresponds to that of a conventional rotary encoder with a track of 5000 pulses, which are output for one rotation, where the rotary encoder is connected to the corresponding gear system in such a manner that it itself rotates once by 360° for each turn of the machine by one machine partition.

It is advantageous for two tracks to have a 90° phase shift, so that the direction of rotation can be determined from the phase shift.

Furthermore, it is advantageous for several different freely programmable reductions to be possible. In that manner, different tracks of a conventional rotary encoder can be simulated, for example, as above, one track with 5000 pulses per rotation and one pulse per rotation.

To select the reductions, it is advantageous to allow for programming of the rotary encoder. The programming can be carried out, for example, with the help of a keyboard, switches, a remote control, a computer or similar devices.

Moreover, the rotary encoder preferably presents a memory to store the reduction information, so that the information does not have to be reentered or transferred each time.

It is also advantageous to freely choose the zero point of the reduction. This means, for example, that in the case of a reduction of 10,000:1 it is established which one of the 10,000 pulses leads to the output of the individual signal pulse. As a result, it is not necessary to conduct a mechanical adjustment of the zero point, to set a certain position of the rotor with respect to the machine partition in comparison to a zero marking, because the position can be set by a selection.

Furthermore, it can be advantageous to choose different zero points for different problems, that is, for the different reductions.

The selectable reductions are advantageously in the interval from 2:1 to 10,000:1. Possible interval ranges are 3:1, 4:1, 5:1, 10:1, 20:1, 50:1, 100:1, 200:1, 500:1, 1000:1, 2000:1 or 5000:1.

A rotor machine, according to the disclosure, has a rotary encoder.

BRIEF DESCRIPTION OF THE DRAWINGS

An advantageous embodiment of the disclosure will be explained with reference to the attached figures. In the drawing.

DETAILED DESCRIPTION OF THE DISCLOSURE

Figure 1:
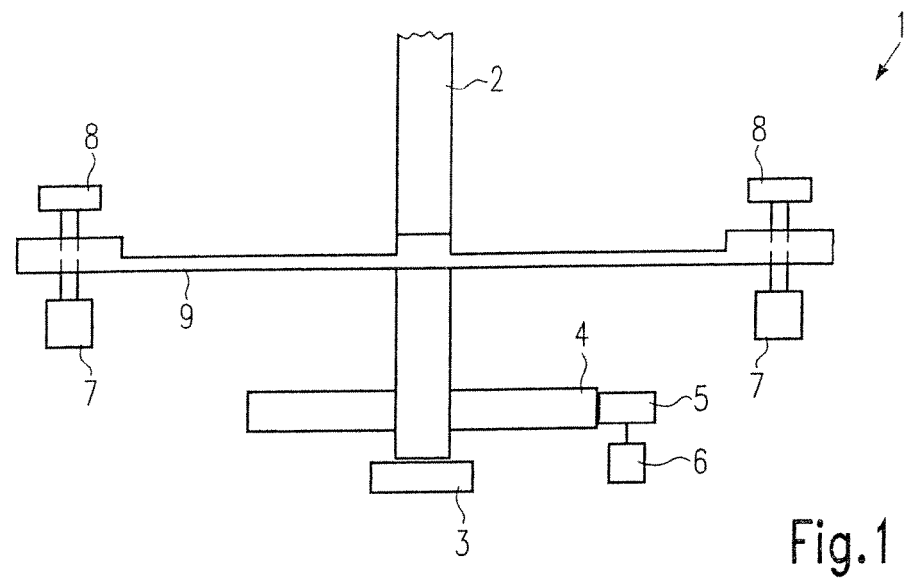
FIG. 1 shows a schematic cross section of a rotor machine.

FIG. 1 is a representation of a rotor machine 1 with a central shaft 2. On the central shaft 2, a rotor 9 is attached. On the rotor 9, rotating plates 8, for example, are located, which can be turned by servo motors 7. Such rotating plates 8 are used, for example, in labeling machines.

Rotor machines, however, are also used in filling machines, blow molding machines, closing machines and similar devices.

To drive the shaft 2, a toothed wheel 4 is provided, in which a toothed wheel 5 engages, which is driven by a motor 6.

To acquire the position of the shaft 2 or of the rotor 9, a rotary encoder 3 is provided on the shaft 2. The latter is connected directly to the shaft 2 without intermediate gear system.

Figure 2:
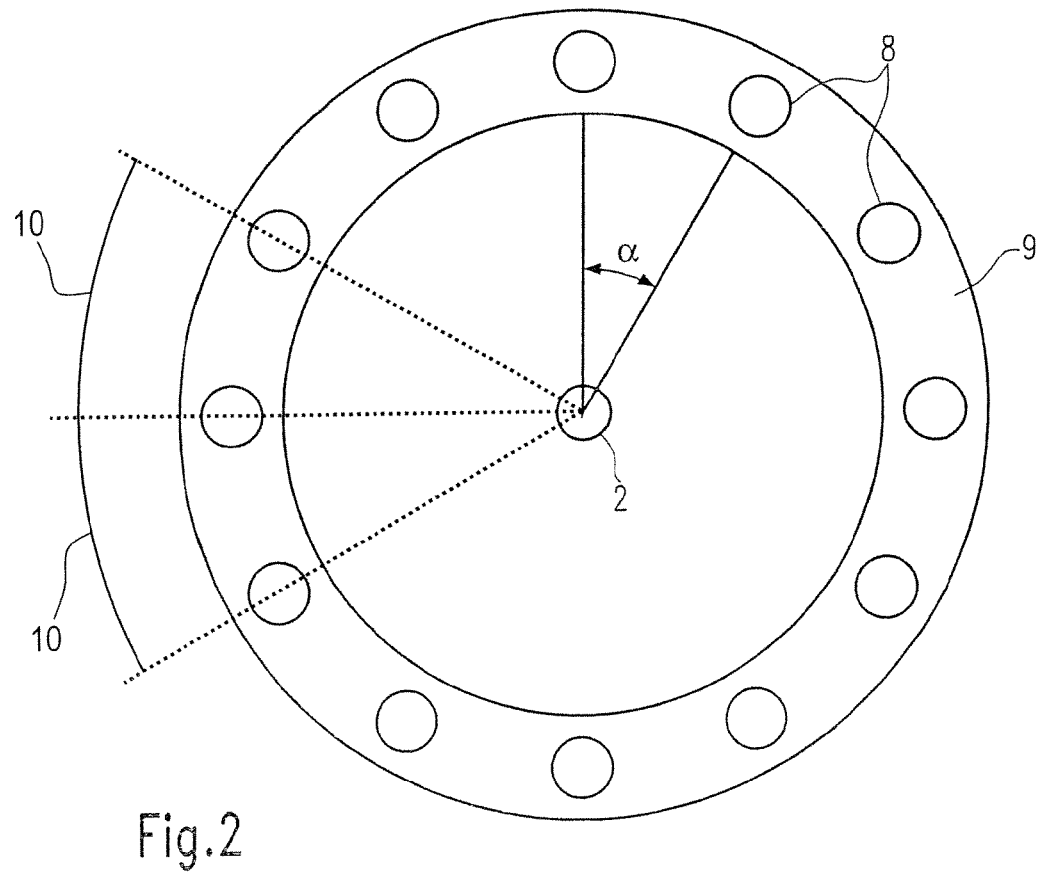
FIG. 2 shows a schematic top view of a rotor machine.

FIG. 2 is a schematic top view of the device of FIG. 1. In the figure, one can see the rotor 9 with the rotating plates 8, which are distributed over the circumference of the rotor 9. The rotor 9 presents 12 rotating plates 8. The angular separation $\alpha$ is, in this case 30°. This means that the machine partition 10 is 30°.

Figure 3:
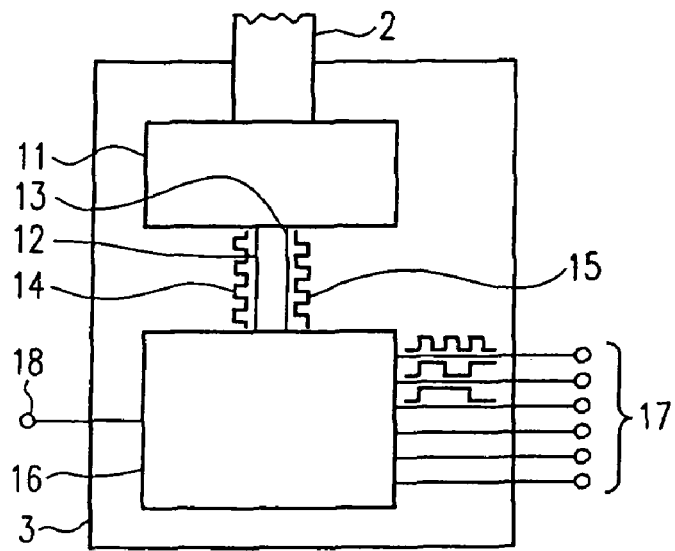
FIG. 3 shows a schematic representation of a rotary encoder.

FIG. 3 is a schematic representation of a rotary encoder 3, which can be provided at the lower end of shaft 2.

The rotary encoder 3 comprises a device 11, in which a track with a pulse series is provided, by means of which signal pulses can be generated.

The generated signal pulses are transmitted through the lines 12 and 13 to a reduction device 16. The signal pulses 14, 15, which are transmitted in the lines 12 and 13, have a phase shift of 90°, so that it is possible to determine therefrom the direction of rotation of the track in the device 11.

In the reduction device 16, different reductions can be carried out.

As shown schematically at the topmost output 17, a 1:1 reduction can also occur. The next highest output 17 presents a 2:1 reduction, and the next output a 4:1 reduction.

Phase-shifted signal pulses can be applied to the other outputs, to determine directions of rotation, or other reductions can be applied.

It could also be sufficient to output only one phase-shifted signal to determine the direction of rotation, for example, the one with the highest frequency of signal pulses.

Considerably higher reductions are also conceivable, such as, 100:1, 1000:1, 5000:1 or 10,000:1.

The output signal pulses can have the same lengths as those that are generated. They can also be longer than the generated signals, as shown in FIG. 3 at the second and third signal output 17 from the top. Here signal pulses whose high and low signals are of equal length are advantageous.

The reduction device 16 can be programmed via an input 18. The reduction device presents corresponding memory devices for the programmed values. The reduction device 16 is designed in such a manner that, via the input 18, the reduction can be entered directly, for example, 5000:1.

It is more advantageous to use an embodiment in which the reduction factor is not entered or chosen, instead a measure of the machine partition 10 is entered, such as a degree value, which corresponds to the machine partition 10 or the number of identical settings, such as, for example, 100 in the case of a machine partition 10 of 3.6°. The reduction device 16 itself then calculates the required reduction factor from these data.

In this construction design, the user does not need to know the number of pulses of a track.

Figure 4:
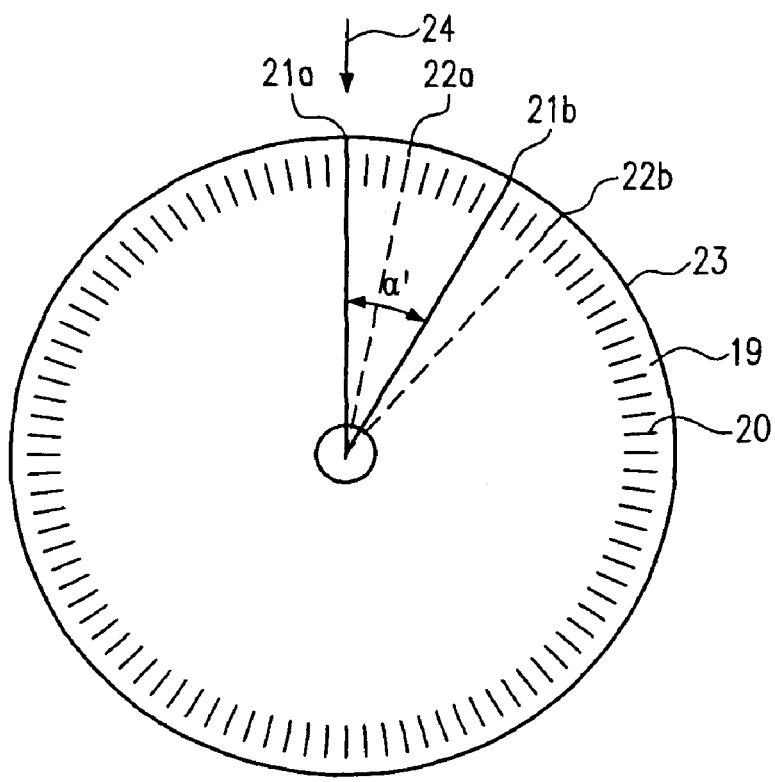
FIG. 4 shows a schematic representation of a disk with a track of a rotary encoder.

FIG. 4 is a schematic representation of a track 19, which contains a series of pulses 20. The track 19 is arranged on a disk 23. The angle of the machine partition 10 should be 30° as in FIG. 2.

Within the machine partition 10, the track 19 presents a large number of pulses 20.

In the case where, for example, a signal should be generated which should be oriented in a certain position with respect to the machine partition 10, it is necessary to fix the zero point of the signal with reference to the rotor.

An example of such a case is a signal series which, during the turning of the rotor by one machine partition 10, outputs precisely one signal pulse.

The latter can then be output during the rotation of the disk 23, when a pulse 20 passes the line 21a at the reference 24. An additional signal pulse would be generated if a pulse 20 passes the line 21b at the reference 24. The lines 21a and 21b enclose an angle $\alpha'$, which corresponds to the machine partition 10.

The lines 22a and 22b also enclose an angle $\alpha'$, which corresponds to the machine partition; however, they have a different zero point. By choosing the appropriate zero point, the signal can be fixed in this manner with correct phase in relation to the machine partition 10.

The method where, using a rotary encoder for a rotor machine, a reduction of the signal pulses to be output is selected, is generally carried out during the construction or the conversion of a rotor machine. In the process, the corresponding rotary encoder can be programmed, for example, with a computer.

During the operation of a rotor machine, the signals of a rotary encoder are output in accordance with the chosen reduction. As a result, a determination of the position of the rotor is possible, where the resolution can be sufficient to resolve the position within one machine partition 10.

The invention claimed is:

1. A rotary encoder for a rotary machine having a rotor, the encoder being coupled to the rotor and comprising:

at least one track with a first pulse series for a generation of signal pulses; and a reduction device to selectably reduce the generated signal pulses for an output, wherein the output signal pulses resolve the angular position of the rotor within an angular distance corresponding to a machine partition of the rotor in order to determine the angular position of the rotor with respect to the machine partition, and wherein the number of output pulses per revolution of the rotary machine is an integer multiple N of the number of identical installations defining the machine partition, N being the greater than 1.

2. A rotary encoder according to claim 1, further comprising a second track having second pulse series that is the same as the first pulse series, but with a 90° phase shift.

3. A rotary encoder according to claim 1, wherein the rotary encoder facilitates a plurality of different programmable reductions.

4. A rotary encoder according to claim 1, wherein the output is phase-shifted.

5. A rotary encoder according to claim 1, further comprising a computer to program a selection of the reduction of the generated signal pulses.

6. A rotary encoder according to claim 1, further comprising a memory to store reduction information.

7. A rotary encoder according to claim 1, wherein the rotary encoder allows a measure to be selected for the machine partition.

8. Rotary encoder according to claim 7, wherein the measure selected is one of the machine partition divided into degrees or the number of identical settings which define the machine partition.

9. A rotary encoder according to claim 1, wherein the encoder facilitates a selectable reduction at a zero point.

10. A rotary encoder according to claim 9, wherein the encoder facilitates a selectable reduction at a plurality of different zero points for different outputs.

11. A rotary encoder or according to claim 9, wherein the zero point is one of programmable or memorable zero point.

12. A rotary encoder according to claim 1, and wherein the selectable reduction is in the interval from approximately 2:1 to 10,000:1.

13. Rotary encoder according to claim 1, further comprising: one of a keyboard, switch, or remote control to program a selection of the reduction of the generated signal pulses.

14. A rotary machine, comprising:
a rotor;
a machine partition;
a rotary encoder being coupled to the rotor and having at least one track with a pulse series for a generation of signal pulses; and
a reduction device to selectably reduce the generated signal pulses for an output,
wherein the output signal pulses resolve the angular position of the rotor within an angular distance corresponding to the machine partition in order to determine the angular position of the rotor with respect to the machine partition, and
wherein the number of output pulses per revolution of the rotary machine is an integer multiple N of the number of identical installations defining the machine partition, N being greater than 1.

15. A method of outputting signals from a rotary encoder coupled to a rotor of a rotary machine, comprising:
generating an output signal that is a selectable reduction of a pulse series received from at least one track associated with the rotary encoder,
wherein the output signal pulses resolve the angular position of the rotor within an angular distance corresponding to a machine partition of the rotary machine in order to determine the angular position of the rotor with respect to the machine partition and
wherein the number of output pulses per revolution of the rotary machine is an integer multiple N of the number of identical installations defining the machine partition, N being greater than 1.

* * * * *

UNITED STATES PATENT AND TRADEMARK OFFICE
CERTIFICATE OF CORRECTION

| | | |
|---|---|---|
| PATENT NO. | : 7,856,726 B2 | Page 1 of 1 |
| APPLICATION NO. | : 11/578022 | |
| DATED | : December 28, 2010 | |
| INVENTOR(S) | : Hartmut Davidson | |

It is certified that error appears in the above-identified patent and that said Letters Patent is hereby corrected as shown below:

In the Claims:

At Column 5, line 26, "memorable" should be -- memorizable --.

At Column 6, line 27, "partition" should be -- partition, --.

Signed and Sealed this

Twenty-third Day of August, 2011

David J. Kappos
*Director of the United States Patent and Trademark Office*